United States Patent
Willauer

(10) Patent No.: US 7,832,490 B2
(45) Date of Patent: *Nov. 16, 2010

(54) COMPOSITIONS CONTAINING SHAPE-CONFORMING MATERIALS AND NANOPARTICLES TO ENHANCE ELASTIC MODULUS

(75) Inventor: Darrin L. Willauer, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/129,203

(22) Filed: May 29, 2008

(65) Prior Publication Data

US 2008/0296020 A1  Dec. 4, 2008

Related U.S. Application Data

(60) Provisional application No. 60/941,262, filed on May 31, 2007.

(51) Int. Cl.
*E21B 33/12* (2006.01)
*E21B 43/24* (2006.01)

(52) U.S. Cl. .................. 166/387; 166/195; 166/248; 166/302; 507/219; 977/773

(58) Field of Classification Search .................. None
See application file for complete search history.

(56) References Cited

U.S. PATENT DOCUMENTS

| | | | |
|---|---|---|---|
| 6,727,003 B1 | 4/2004 | Dyatlov et al. | |
| 6,800,572 B1 | 10/2004 | Rieger et al. | |
| 7,410,597 B2 | 8/2008 | Chen | |
| 7,416,108 B2 | 8/2008 | Philip | |
| 2005/0258570 A1 | 11/2005 | Kong et al. | |
| 2006/0068153 A1 | 3/2006 | Hara et al. | |
| 2007/0144734 A1* | 6/2007 | Xu et al. | 166/187 |
| 2007/0264481 A1* | 11/2007 | DeSimone et al. | 428/220 |
| 2008/0099175 A1 | 5/2008 | Chu et al. | |
| 2008/0149238 A1 | 6/2008 | Kleckner et al. | |

* cited by examiner

*Primary Examiner*—Zakiya W. Bates
(74) *Attorney, Agent, or Firm*—Cantor Colburn LLP

(57) ABSTRACT

A composition, apparatus and method of use of the composition and apparatus are described. In one aspect, a composition may include a shape-conforming material and nanoparticles sufficient to provide an elastic modulus of the composition that is greater than the elastic modulus of the shape-conforming material. A method of deploying an apparatus using such a composition may include placing the apparatus at a suitable location in a wellbore and activating the composition to deploy the apparatus in the wellbore.

19 Claims, 1 Drawing Sheet

COMPOSITIONS CONTAINING SHAPE-CONFORMING MATERIALS AND NANOPARTICLES TO ENHANCE ELASTIC MODULUS

CROSS-REFERENCE TO RELATED APPLICATION

This application takes priority from U.S. Provisional Patent Application Ser. No. 60/941,262, filed on May 31, 2007.

FIELD OF THE DISCLOSURE

This disclosure relates generally to shape-conforming materials, and more particularly to those that may be used downhole.

BACKGROUND INFORMATION

In the past various methods have been used to provide materials that are capable of filling the annular space between production tubulars and a wellbore wall in both cased-hole and open-hole wellbores. Such materials have been found to be useful for sand control and for isolating a portion of the formation. Sand control methods typically utilize gravel packing outside of downhole screens. The gravel inhibits or prevents the production of undesirable solids (such as sand) from the formation, while still allowing the flow of desirable production fluids. More recently, with the advent of tubular expansion technology, a downhole screen can be expanded in place to eliminate the surrounding annular space that had heretofore been packed with gravel. Such a method may not be practical in some cases due to wellbore shape irregularities. While a fixed swage can be used to expand a screen by a fixed amount, it does not always effectively address the problem of wellbore irregularities. Furthermore, a washout in the wellbore can sometimes result in formation of a large annular space outside of the screen, while an unanticipated area of small diameter in the wellbore can result in sticking of the fixed swage, causing problems in placing the fixed swage to the desired location. Flexible swages offer the ability to flex inwardly in tight areas, which may reduce the chance of sticking, but still have a finite expansion capability. Therefore, the problem of annular gaps or voids beyond the range of the swage remains substantially unadressed by these approaches.

Alternative screen designs have included use of a pre-compressed mat held by a metal sheath, which is then subjected to chemical attack when placed in a desired downhole location. Once in position the mat is allowed to expand from its pre-compressed state, but the screen itself does not expand. Some of these designs suffer from the problem of relatively rapid "locking in" of the space-filling means at a given location following its introduction downhole. This rapid "lock-in" in many instances can prevent or discourage the repositioning of the device for optimal performance and can result in costly remediation work.

Thus, there is a need for improved apparatus and compositions and methods for deploying the same in wellbores to perform various functions, such as filling annular spaces, isolating zones, proving seals, etc.

SUMMARY

Accordingly, in one aspect there is provided a composition comprising a shape-conforming material and at least one carbon nanotube. In another aspect, the composition may contain a shape-conforming material and nanoparticles in an amount that is sufficient to provide an elastic modulus of the composition that is greater than the elastic modulus of the shape-conforming material near or above a glass transition temperature.

In another aspect there is provided an apparatus comprising a shape-conforming material and at least one carbon nanotube. In another aspect, the apparatus may contain a shape-conforming material and nanoparticles in an amount sufficient to provide the elastic modulus of the composition that is greater than the elastic composition of the shape-conforming material near or above a glass transition temperature.

In yet another aspect there is provided a method of deploying an apparatus in a wellbore, comprising: providing a device having a first shape, the device including a composition made from a shape-conforming material and nanoparticles in an amount sufficient to cause the composition to attain an elastic modulus that is greater than the elastic module of the shape-conforming material near or above a glass transition temperature; placing the device at a downhole location; and activating the composition in the wellbore to cause the device to attain a second shape.

BRIEF DESCRIPTION OF THE DRAWINGS

For a detailed understanding of the compositions, apparatus containing such compositions and methods for deploying such apparatus and compositions downhole described and claimed herein, reference should be made to the following detailed description of the embodiments, taken in conjunction with the accompanying drawings, in which like elements generally have been given like numerals, wherein:

DETAILED DESCRIPTION OF THE EMBODIMENTS

Figure 1:
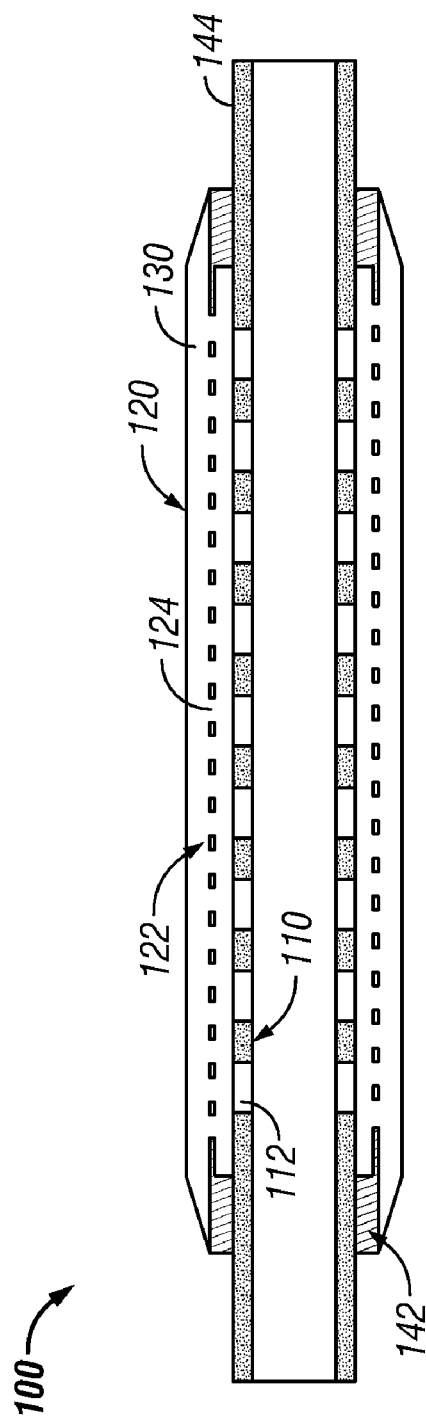
FIG. 1 is a schematic cross-section view of an exemplary screen for use in a wellbore wherein the shape-conforming member is in a compressed or an unexpanded position.

The aspects of the disclosure herein include the manufacture and use of materials (also referred to herein as "compositions") that in one aspect are capable of being expanded to a first or original size and shape by exposing such materials to a selected energy source and are further capable of being compressed to retain a second size and shape when the supply of the energy has been removed. Such compositions may then be placed into a wellbore and expanded to the original size and shape by initiating or exposing them to a selected form of energy. In exemplary, non-limiting embodiments, such deployment may occur at a point in time that is relatively removed from the time of the material's initial placement. In other non-limiting embodiments, the materials may exhibit a desirable elastic modulus following their deployment, thereby enabling a desired tightness of sealing of a space in the wellbore, which space may be in an open wellbore or cased wellbore. In one aspect, such materials may offer to a rig operator adequate time and opportunity for optimized positioning of the devices made using such materials, while still ensuring a desirably tight "fit" or "seal" within the wellbore without significant edge voids, regardless of anomalies in the shape or construction of the wellbore. Such materials may be deployed or activated after the apparatus comprising such materials has been positioned at the downhole location, thus, preventing the deployment of such apparatus during placement of the apparatus in the wellbore.

Aspects hereof also include compositions that include shape-conforming materials (also referred to as) "shape-memory materials" and a selected amount of certain nanoparticles, apparatus made by using such materials and their methods of use. An apparatus may be of any type suited for downhole use: for example, filling an annulus within a borehole in a location surrounding one or more production tubulars. In this embodiment a layer of the shape-conforming material containing nanoparticles may surround or be disposed on a portion of a tubular member. As used herein, the term "production tubulars" is defined to include, for example, any kind of tubular that is used in completing a well, such as, but not limited to, production tubing, production casing, intermediate casings, and devices through which hydrocarbons flow to the surface. Examples of such apparatus include, in non-limiting embodiments, sand control screens or assemblies, annular isolators used to block off non-targeted production or water zones, selective flow control devices, such as sliding sleeves, and the like. The method includes methods for use as sand control screens or assemblies, annular isolators, such as packer, and the like, as well as any uses in which space-filling following placement is desired. Because the space-filling apparatus forms a layer around the production tubular, it is alternatively hereinafter in some embodiments termed as a "layer."

In one aspect, a layer may be prepared using a shape-conforming material which may include, but is not be limited to, syntactic and conventional memory foams and combinations thereof. As used herein, the term "memory" refers to the capability of a material to withstand certain stresses, such as external mechanical compression, vacuum and the like, but to then return, under appropriate conditions, such as exposure to a selected form of energy, to or at least toward, the material's original size and shape. Any suitable material may be used as a shape-conforming material, including foams. In general, conventional foams are those prepared from a medium, in many embodiments offering elastomeric properties, which has been "foamed," i.e., formed into a solid structure by expansion resulting from bubbles, the bubbles having resulted from introduction into the foaming medium air or a gas or combination of gases such that the foaming medium is expanded to form cells of any dimension. Conversely, syntactic foams are lightweight engineered foams manufactured by embedding hollow spheres, typically of glass, ceramic or polymers, in a resin matrix. The embedded spheres are then removed, frequently but not necessarily by dissolution, leaving a solid material with an essentially cellular structure.

In certain non-limiting embodiments, the foam may be either open cell or closed cell, and the selection of such will generally depend upon the desired properties of the space-filling apparatus. Open cell foams, for example, are those foams wherein a significant proportion of the cell walls that form during the foaming process are either also broken during that process, or are broken thereafter, by application of mechanical forces. Regardless of how the open cell structure is attained, the foam may be, in certain non-limiting embodiments, sufficiently porous so as to enable the passage of production fluids therethrough. This type of foam may be particularly suited for use in sand control devices or assemblies, particularly assemblies in which most of the pores of the cells have a diameter insufficient to allow passage therethrough of a majority, or most, produced solids, e.g., sand, alternatively referred to as "fines." In contrast, closed cell foams may be more suited for use in annular isolation apparatuses, where it is desired to prevent most or all passage of wellbore materials, whether liquid, solid, or both, therethrough.

The types of materials that may be suitable for preparing the shape-conforming material may include any material that is able to withstand typical downhole conditions without undesired degradation. In non-limiting embodiments, such may be prepared from a thermoplastic or thermoset medium. This medium may contain a number of additives and/or other formulation components that alter or modify the properties of the resulting shape-conforming material. For example, in some non-limiting embodiments the shape-conforming material may be either thermoplastic or thermoset in nature, and may be selected from a group consisting of polyurethanes, polystyrenes, polyethylenes, epoxies, rubbers, fluoroelastomers, nitrites, ethylene propylene diene monomers (EPDM), other polymers, combinations thereof, and the like.

In certain non-limiting embodiments the shape-conforming material may have a "shape memory" property. As used herein, the term "shape memory" refers to the capacity of the material to be heated above the material's glass transition temperature, and then be compressed and cooled to a lower temperature while still retaining its compressed state. However, it may then be returned to its original shape and size, i.e., its pre-compressed state, by reheating close to or above its glass transition temperature. This subgroup, which may include certain syntactic and conventional foams, may be formulated to achieve a desired glass transition temperature for a given application. For instance, a foaming medium may be formulated to have a transition temperature just slightly below the anticipated downhole temperature at the depth at which it will be used, and the material then may be blown as a conventional foam or used as the matrix of a syntactic foam.

The initial (as-formed) shape of the shape-conforming material layer may vary, though an essentially cylindrical shape is usually well-suited to downhole wellbore deployment for annulus-filling purposes. Concave ends, striated areas, etc., may also be included in the design to facilitate deployment, or to enhance the filtration characteristics of the layer, for example, in cases where it is to serve a sand control purpose.

An aspect hereof comprises the inclusion in a shape-conforming material one or more carbon nanotubes (CNTs). Carbon nanotubes are an allotrope of carbon. A single CNT is a one-atom thick sheet of graphite, called graphene, which has been rolled into a seamless cylinder and has a diameter of no more than a few nanometers. This results in a nanostructure that is substantially one-dimensional, such that the length-to-diameter ratio may exceed 10,000. The length is typically may be up to 1 the centimeters range, with one end frequently capped with a hemisphere of the "buckyball" structure. CNTs are extremely strong and conduct heat relatively efficiently. The CNTs may be single-walled nanotubes or multi-walled nanotubes. In one non-limiting embodiment, a subset of multi-walled nanotubes, called double-walled carbon nanotubes (DWNTs), may also be selected.

Preparation of CNTs that are useful herein may be carried out by any methods known to those skilled in the art, including but not limited to arc discharge, laser ablation, high pressure carbon monoxide (HiPco), and chemical vapor deposition. For example, a combustion chemical vapor deposition (CCVD) technique may be selected and carried out via the selective, catalyzed reduction of oxide solid solutions in methane and hydrogen. Most of these processes take place in a vacuum or with process gases. If a plasma is generated during CVD, nanotube growth will follow the direction of the electric field, thereby enabling synthesis of vertically aligned nanotubes.

In some non-limiting embodiments hereof a single CNT may be incorporated into the shape-conforming layer, generally during the formation of the composition. In other non-limiting embodiments CNTs may be incorporated in an amount from about 0.1 percent to about 10 percent, by weight of the shape-conforming material and CNTs together. In still other non-limiting embodiments, the CNTs may be incorporated in an amount of from about 0.5 percent to about 2 percent. Other suitable amounts also may be utilized. In one aspect, a composition made for use in wellbores may be made using a selected shape-conforming material and an amount of CNTs such that the elastic modulus of the composition is greater than the elastic modulus of the shape-conforming material. Such a composition tends to remain placed in the wellbore after deployment or activation.

While the CNTs may be incorporated in the shape-conforming material in a "neat" form, it is, in many non-limiting embodiments, desirable to associate the CNTs within the material of the shape-conforming layer such that the two distinct materials are held together at their molecular levels. In many embodiments this association may be accomplished by inclusion of a binding agent, by means of functionalizing a surface of the CNTs, or both. The result of some type of molecular level association may be a greater elastic modulus to the shape-conforming layer or material as a whole, than would be exhibited without such a molecular level association.

For example, U.S. Pat. No. 6,905,667, which is incorporated herein by reference in its entirety, describes a method for noncovalenty functionalizing nanotubes in organic and inorganic solvents, including polymers, in what is called a non-wrapping approach, i.e., the polymer does not completely envelop the diameter of the nanotube. One example of this method involves association of a polymer with a nanotube via parallel π-stacking, wherein the polymer's backbone extends substantially along the length of the nanotube.

In order to obtain this type of relationship between the carbon nanotubes and the shape-conforming material, which may improve the strength, elastic modulus, and other properties of the shape-conforming material, the polymer may be selected such that it interacts via this r-stacking. For example, polymers with π-conjugated backbone structures may be used to functionalize carbon nanotubes in organic solvents by solubilizing the nanotubes. Such a polymer may comprise, for instance, a poly (aryleneethynylene).

Those skilled in the art will understand that other ways and methods of incorporating the carbon nanotube(s) into a shape-conforming material may be used, without departing from the scope or spirit of the disclosure herein.

In addition to selection of a shape-conforming material, it may be desirable in some non-limiting embodiments to select an appropriate "deployment modifier." A "deployment modifier," as used herein, may be generally defined as any manner by which the deployment, i.e., expansion to or toward original size or shape of the foam after its compression, is modified. Such modification is generally a lengthening of the time between the compression, including any reduction in size/shape of the shape-conforming material, and its resilient expansion back to its original size and shape such as would be induced by the simple reheating of the shape-conforming material back to or near its glass transition temperature. The deployment modifier may be any physical material which can be combined with or applied to the shape-conforming material to modify such deployment. For example, the deployment modifier may, in some embodiments, be selected from the group consisting of water-soluble and oil-soluble adhesives and biopolymers, and combinations thereof. In certain non-limiting embodiments it may be selected from, for example, the group consisting of polyvinyl acetate (PVA), polyvinyl alcohol, (PVAl or PVOH), polyvinyl acetate emulsions, carboxymethylcellulose, methylcellulose and hydroxypropyl methylcellulose, hydroxyethylcellulose, copolymers of acrylamide and a cationic derivative of acrylic acid, polylactic acid (PLA), cellulose actetate (CA), blow starch (BA), acrylamide polymers, combinations thereof, and the like.

The deployment modifier may be included with the foam by any suitable method and in any suitable construction or configuration, and in certain particular, non-limiting embodiments it may be incorporated with the shape-conforming material either before or after compression to an interim size and shape. This interim size and shape may alternatively be referred to herein as the shape-conforming material's "compressed state." As used herein, the term "compression" means the result of the application of any force or combination of forces that reduces the overall exterior surface dimension of the foam. Thus, any "compressed" foam is one that has had its overall exterior surface dimension reduced as a result of such force or forces. Such forces may include, but not be limited to, simple mechanical compression from outside of the foam such as that accomplished by a mechanical press, a hydraulic bladder, or a swaging process, as well as vacuum and the like. The incorporation may be accomplished by, for example, immersing the original shape-conforming material, including the CNTs, into, and allowing it to absorb, a liquid deployment modifier until maximum weight gain of the shape-conforming material is achieved. Additional absorption and size reduction may be obtained by drawing a vacuum on the shape-conforming material. In some cases a deployment modifier, such as a water-soluble or oil-soluble adhesive, may be dissolved in a solvent such as water, alcohol or an organic liquid in order to control the adhesive's concentration level and viscosity. Injection may also be used to incorporate the deployment modifier with the shape-conforming material. Once the deployment modifier is in the shape-conforming material, the material may then be compressed and the compression maintained while the deployment modifier is allowed to dry or cure to "lock in" the compressed size and shape. In still other non-limiting embodiments the deployment modifier may be coated or "painted" onto the compressed shape-conforming material. It may alternatively be formed into a sheet or film and used to encase the exterior, exposed surfaces of the foam. Combinations of any or all of these methods may be used, and more than one deployment modifier may be used with any method or combination of methods.

In some non-limiting embodiments the deployment rate of the shape-conforming material is controlled primarily by the level and type of deployment modifier that is used. For example, a higher loading level or higher concentration of a deployment modifier may be employed in order to extend the deployment time. Alternatively or in addition, the deployment modifier having a slower dissolution rate and/or solubility rate may be selected for the same purpose. In other non-limiting and particularly desirable embodiments, an appropriate deployment modifier may be combined with, as the shape-conforming material, a shape memory foam having a glass transition temperature that approximates the anticipated downhole temperature at the location where the apparatus of the invention will be deployed. Thus, the tendency of the shape memory foam to return to its decompressed state at that temperature may be advantageously employed to initiate, or augment initiation of, deployment, while the deployment modifier will prevent such initiation until a desired time following arrival at the desired location. Another method of effectively controlling deployment may be to select as a deployment modifier a combination of two or more compounds having different dissolution rates.

In some non-limiting embodiments, the shape-conforming material comprising CNTs surrounds one or more production tubulars, frequently as a layer, which may be full or partial. In some non-limiting embodiments the shape-conforming material layer may be prepared in situ, adhered onto the production tubular itself as the foaming gas is incorporated into the foaming medium in conventional foam technology, with the foam thereafter compressed and, either before or after compression, immersed into or injected with a deployment modifier. In this embodiment the production tubular is then ready to be introduced into the wellbore. In other non-limiting embodiments a suitable foam comprising the CNTs may be prepared independently, slid onto or collared around the production tubular in either compressed or uncompressed state, and in either deployment-modified or deployment-unmodified state, such that it surrounds, in whole or in part, the tubular. If deployment modification is desired, a suitable deployment modifier is then added or incorporated via an effective means, and if such is not yet compressed, appropriate compression may be carried out.

Once the appropriate steps have been taken, the production tubular is then ready for introduction into the wellbore. In such embodiments a suitable adhesive may be used to ensure that the foam remains in place on the production tubular during transit to the production tubular's desired downhole deployment location. As will be recognized by those skilled in the art, a suitable adhesive may be any adhesive which accomplishes the goal without subjecting either the foam, the deployment modifier, or the production tubular to undesired degradation or other effects. For example, if an epoxy foam is used, an epoxy adhesive may be particularly useful for attaching the foam to the production tubular.

Once an apparatus of the invention comprising, for example, a production tubular and its surrounding shape-conforming material (which, in some embodiments, may include a plurality of such layers), is introduced into the wellbore and conveyed to its desired location, it will desirably, in non-limiting embodiments of the invention, remain in a substantially compressed state. Because the shape-conforming material remains substantially in its compressed state, being frequently a generally cylindrical construction having a radius that is somewhat less than the overall wellbore radius, it may be moved, positioned, and repositioned as desired, and will not deploy because of the effect of the deployment modifier and/or because the temperature is below the glass transition temperature (Tg). However, once the drill rig operator has decided that the location of the production tubular and associated shape-conforming material layer have been optimized, this deployment may be initiated and carried out via exposure of the deployment modifier to a deployment agent for a sufficient period of time.

As defined herein, the "deployment agent" is any material or condition that either dissolves, removes or otherwise deactivates any deployment modifier such that deployment to or toward the pre-compression state of the shape-conforming material is enabled, or that actively, in and of itself, initiates deployment. Thus, the deployment agent may, in some non-limiting embodiments, be simply an elevated temperature, in some cases approaching or approximating the glass transition temperature (Tg) of the shape-conforming material, that induces the shape-conforming material to "decompress," or to return to or toward its pre-compression state. The heat may be inherent within the wellbore, or may be provided in some part by any appropriate means. Such alternative heat source could, in some non-limiting embodiments, be a wireline-deployed electric heater, or a battery-fed heater. In such embodiment the heat source could be mounted to a production tubular, incorporated into it, or otherwise mounted in contact with the shape memory foam layer. The heater could also, in other non-limiting embodiments, be controlled from the surface at the well site, or it could be controlled by a timing device or a pressure sensor. In still another non-limiting embodiment, an exothermic reaction could be created by chemicals pumped downhole from the surface. In yet another non-limiting embodiment, the CNTs may receive an electrical current that, because of their superior conductive capability, provides uniform joule heating to the shape-conforming layer to initiate deployment. Other energy forms may also be used to initiate deployment, including: incident radiation, including infrared, gamma, and ultraviolet radiation, and combinations thereof; convection; conduction; and combinations of any of the above.

In other non-limiting embodiments, water, brine or oil may be introduced as a solvent into the wellbore at approximately the location of the shape-conforming material. At this location the deployment modifier is exposed to the solvent and because it is, as appropriate and for example, a water-soluble or oil-soluble adhesive or biopolymer, it is, as a result and after a sufficient period of time, at least partially dissolved. Once dissolution has progressed to a sufficient extent, such deployment occurs, usually within a short time thereafter. In alternative embodiments the deployment agent may react with the deployment modifier such that the deployment modifier no longer operates to modify deployment. Because the shape-conforming material layer exhibits, by its nature, a certain resilience and is sized and shaped to contact the wellbore wall, generally within a radius that is to some extent less than the overall annular radius of the pre-compressed shape-conforming material layer, the deployed shape-conforming material layer pushes into and fills voids and irregularities in the sides of the wellbore and may make optimum contact with the wellbore wall. Such contact may thus be tailored to effect a gasket-like fit around the production tubular, and may control (i.e., allow or inhibit, depending upon the goal) the flow of sand and/or production fluids therethrough, as desired.

The desired downhole location for use will include, in some non-limiting embodiments, production zones wherein sand control is desired; production zones to be blanked; areas where annular isolation is desired; junctions between two tubulars such as in the case of multilaterals; and the like. Where the present invention is used in or as a sand control apparatus, appropriate selections of a foaming medium and, if selected, deployment modifier, as well as appropriate levels and selections of gases or microspheres to blow or form the foam, according to whether it is a conventional or syntactic foam, are desirable to optimize the characteristics of the deployed foam to fulfill such sand control function. Such selections may serve to ensure the desired quality and quantity of production fluids obtained from the well. These desired characteristics will typically include considerations that are well known to those skilled in both the drilling and foam-preparation arts, including, for example, density, average porosity diameter, uniformity of porosity, resistance to degradation upon exposure to hydrocarbons, water, and/or brine, selection of and compatibility of the foaming formulation with the deployment modifier, time to full deployment, foam resilience, combinations thereof, and the like.

If the apparatus is to be employed for the purpose of annular isolation, such as "blanking" of a non-targeted production zone, many similar foam characteristics may be considered as desirable and tailored to the purpose, but will, in many cases, differ from those characteristics sought for sand control. For example, for annular isolation porosity may be desired, and thus greater density and a generally smaller cell character may, in some embodiments, be sought. Tolerance to porosity may also be affected by, or affect, decisions relating to the selection of, and particularly means of inclusion or incorporation of, the deployment modifier. Additionally, the shape-conforming material may be produced with either an outer or inner skin, or both, such that the skin resides on one or more outboard ends. If a skin is present, it may need to be removed from at least a portion of the shape-conforming material, prior to the time at which deployment is desired, in order to hydrostatically pressure balance the material. This pressure balancing is generally desirable to enable deployment.

One advantage of the presence of the CNTs in the shape-conforming material is that it may substantially increase the elastic modulus and/or the strength of the material, such that, after deployment, the elastic modulus and/or the strength shape-conforming material remains higher than it would be without the presence of the CNTs. This improvement in elastic modulus and/or strength may, in certain non-limiting embodiments, ensure that the apparatus forms a sufficiently tight seal in the space it is designed to fill.

In certain cases, when a deployment modifier is employed, deployment time may be delayed and may be controlled with a relatively high degree of precision. In general, the deployment time, from initiation of deployment to a point at which the shape-conforming material has returned to 90 percent of its original size and shape, may be increased by at least about 200 percent, and in certain desirable embodiments such increase may be at least about 400 percent, when compared to deployment of an identical construction using the same shape-conforming material, but without a deployment modifier. Furthermore, it will be obvious to those skilled in the art that the point of initiation itself may be determined, with relative precision, by the skilled rig operator, since deployment will, by definition, not initiate until the deployment modifier is subjected to an appropriate deployment modifier neutralizing agent for a sufficient time period.

For ease of understanding and explanation, the shape-conforming materials and apparatus and methods using the same have been described in relation to the use of carbon Nanotubes. In other, aspects, however, the composition may be made using a shape-conforming material and nanoparticles that absorb one or more forms of energy and cause the composition to heat to near or above the glass transition temperature. In one aspect, the shape-conforming material may be any suitable material, including the materials described herein. The nanoparticles may be metallic nanoparticles made from one or more of gold, silver, platinum, titanium, aluminum, copper, zinc, zirconium, iron, tin and nickel, a metal oxide, such as iron oxide, carbon, including carbon nanotubes, bucky balls and graphene. The energy source may be: electric current, electromagnetic radiation, including infra red radiation, ultraviolet radiation, gamma ray radiation, microwaves and/or heat. The apparatus using such shape-conforming materials may be any device that is configured to expand to attain a shape different from its current or original shape. Such apparatus may include, but is not limited to a sealing device, an isolator, a solid particle flow control device, and a fluid flow control device. In such apparatus, the composition has a first shape that has been obtained by compressing the composition near or above the glass transition temperature and it attains a second expanded shape when the composition is exposed to the energy. The nano particles in the composition, in one aspect, may be sufficient to heat the memory-conforming material to the second shape. The nanoparticles in one such composition may be from about 0.1% to about 10% by weight.

The apparatus that contains compositions that use a memory-conforming material and energy-absorbing nanoparticles may be placed at a suitable location in a wellbore and then activated or exposed to a suitable form of energy. The energy may be conveyed from a surface source into the wellbore or generated downhole. In one aspect, a radiation source may be conveyed with or after the placement of the device in the wellbore. The source may be activated once the device has been set. The nanoparticles will absorb the radiation and heat, causing the shape-conforming material to heat to near or above it glass transition temperature, causing it to expand to or near its original shape.

The preceding description and the following example is not intended to define or limit the description herein in any way. Those skilled in the art will be fully aware that selections of foaming media and formulations and combinations thereof; starting materials and preparation conditions for any component or combination of components; functionalization or other molecular association means and methods; deployment modifiers and combinations and configurations thereof; reaction protocols; shape-conforming material layer, production tubular, and CNT configurations and types; and the like; may be varied within the scope of the claims appended hereto.

EXAMPLE

A mixture of EPON 862 (diglycidyl ether of bisphenol-F) epoxy, which is commercially available from Hexion Specialty Chemicals, Inc., is combined with NanoSolve™ additive, commercially available from Zyvex Corporation, to produce a mixture that contains 0.5-1.5 percent CNT's by weight. The NanoSolve™ additive contains Zyvex's Kentera™ functionalization bridge, that attaches the CNTs to the backbone of the EPON 862 epoxy polymer. This formulation is then combined with a shape memory and curing agent, selected from examples of such in, for instance, U.S. Pat. No. 6,110,982, which is incorporated herein by reference in its entirety, to produce a shape memory foam.

Figure 2:
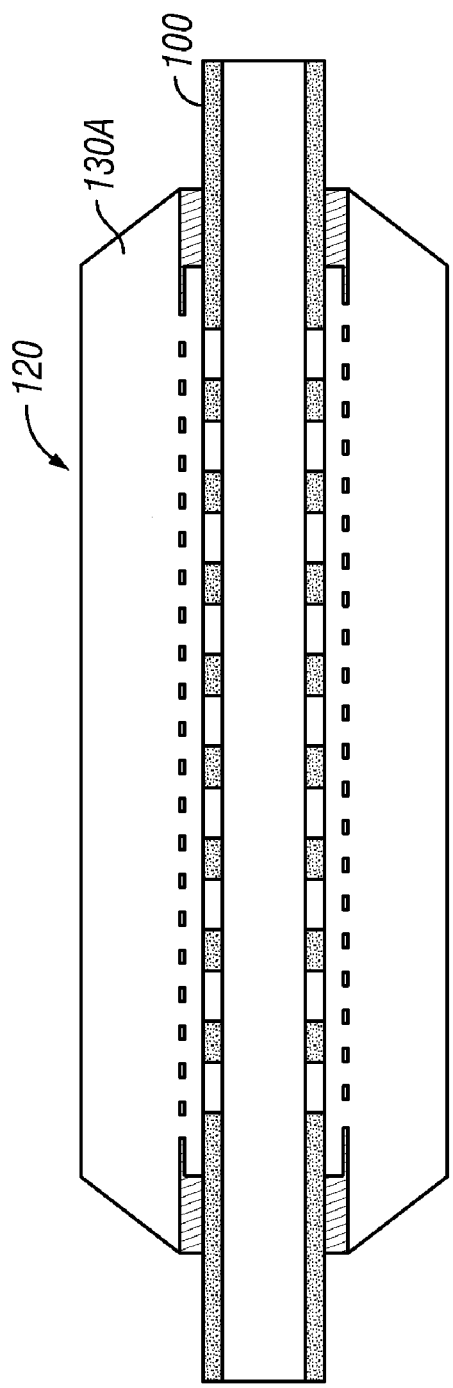
FIG. 2 is a schematic cross-section view of the screen of FIG. 1 when the shape-conforming member is in an expanded position.

FIG. 1 is a schematic cross-section view of an exemplary sand screen 100 for use in a wellbore when the shape-conforming member is in an unexpanded position. It should be noted that FIG. 1 is only one example of an apparatus that may utilize a shape-conforming material described herein. The sand screen 100 shown is generally conformable to a particular wellbore size. The sand screen 100 includes a tubular 110 having a number of suitable perforations or openings 112. The openings 112 may be of any suitable dimensions. Holes of about 0.5 inch in diameter have been found to be useful in certain applications. The tubular member 110 is surrounded by a shape-conforming assembly or structure 120, which includes a screen or mesh 122 embedded in a shape-conforming material 130. The screen or mesh 122 may be made from any suitable material, such as a metal, alloy, composite material or any combination of such materials. The screen or mesh 122 includes openings 124 of suitable dimensions that allow a fluid, such as formation fluid, to flow therethrough and inhibit or prevent the flow of certain solids, such as sand. For sand screen applications, the openings 124 are typically about 0.1-0.375 inches in diameter, which may be punched in the screen 122. The screen 122 may be formed by extruding a suitable material that opens up gaps, similar to louvers or any other desired shape. In the embodiment of FIG. 1, the screen 122 is integral to the shape conforming material 130. In one aspect, the shape conforming material 130 may be created around and through the screen 122. This creates a surface bond. End members 142 and 144, which may be in the form of rings made from a suitable metallic, non-metallic or a combination material, may be attached to the ends of the screen 122. The end members 142 and 144 may be attached to the screen 122 by any suitable method, such as welding. The end members 142 and 144 also can provide a mechanical and pressure seal between the shape-memory assembly 120 and the tubular 110. The seal and anchoring of the shape-conforming assembly 120 to the tubular 110 may be provided by any suitable method, such as with set screws, o-rings, swaging or any other attachment mechanism. The screen 110 is placed in the wellbore at a suitable location or depth and then deployed to expand. FIG. 2 shows a schematic cross-section view of the screen 100 of FIG. 1 when the shape-conforming member is in an expanded position. After deployment, the shape conforming assembly expands as shown in FIG. 2 to fill the gap between the wellbore casing and the formation. As noted earlier, any structure using the shape-conforming material and methods described herein may be made, including but not limited to sand screens, packer and other such devices.

The disclosure herein, in one aspect, provides composition that includes a shape-conforming material that comprises at least one carbon nanotube. In one aspect, the shape-conforming material is a foam polymer. In one aspect, the shape-conforming material includes from 0.1% to 10% by weight of carbon nanotubes. The carbon nanotubes may be single-walled, multi-walled, or a combination thereof. In another aspect, the shape-conforming material may be a thermoplastic or thermoset polymer. The polymer may be functionalized to provide a molecular level association between the polymer and the at least one carbon nanotube. In one aspect, the polymer may have a π-conjugated backbone structure that solubilizes the carbon nanotubes in the polymer. In another aspect, the shape-conforming material may have a glass transition temperature and an elastic modulus property such that, when the shape-conforming material is heated near or above its glass transition temperature, the elastic modulus is greater than the elastic modulus of the shape-conforming material at the same temperature absent the at least one carbon nanotube. In another aspect, the shape-conforming material is compressible to a desired shape when it is heated to a temperature near or above the glass transition temperature and it maintained the desired shape after the temperature falls below the glass transition temperature. In another aspect, the shape-conforming material is suitable to be deployed by heating close to or above the glass transition temperature. The heating may be done by applying an electrical current, incident radiation, convection, conduction or a combination thereof. The incident radiation may be selected from infrared, gamma, ultraviolet radiation, or any combinations thereof. The shape-conforming member may include a deployment modifier, which may be a polyvinyl acetate (PVA), polyvinyl alcohol, (PVAl or PVOH), polyvinyl acetate emulsions, carboxymethylcellulose, methylcellulose, hydroxypropyl methylcellulose, hydroxyethylcellulose, copolymers of acrylamide and a cationic derivative of acrylic acid, polylactic acid (PLA), cellulose actetate (CA), blow starch (BA), acrylamide polymers, or combinations thereof.

Although the apparatus shown in FIGS. 1 and 2 is described using compositions containing carbon nanotubes, such and other devices may also be made using compositions that contain energy-absorbing nanoparticles as described above. Compositions or apparatus containing such compositions may be activated by irradiating the compositions to a suitable radiation source.

In another aspect, the disclosure provides a shape-conforming material that comprises at least one carbon nanotube, wherein the shape-conforming material has a glass transition temperature and an elastic modulus property. The shape-conforming material is heated to a temperature above its glass transition temperature and compressed to form a compressed porous material. The compressed porous material remains compressed after its temperature falls below the glass transition temperature. The compressed porous material is suitable for deployment upon reheating near or above the glass transition temperature, wherein the elastic modulus property of the shape-conforming material is greater than the elastic modulus property of the shape-conforming material reheated to the same temperature absent the at least one carbon nanotube. The heating may be carried out by exposure of the compressed porous material to electrical current, incident radiation, convection, conduction or a combination thereof. The incident radiation may be selected from the group consisting of infrared, gamma, and ultraviolet radiation, and combinations thereof. In another aspect, the apparatus comprises a production tubular, and wherein the shape-conforming material forms a layer on the production tubular.

In another aspect, the disclosure provides a method of fully or partially filling a downhole area with a shape-conforming material comprising: introducing into a downhole area to be filled a shape-conforming material comprising at least one carbon nanotube, the shape-conforming material having been heated to a temperature above its glass transition temperature, and concurrent with or subsequent thereto the shape-conforming material having been subjected to compression, followed by cooling to a temperature below the glass transition temperature, while the compression is maintained; and initiating or allowing initiation of deployment of the shape-conforming layer by a deployment agent such that the downhole area is filled or partially filled by the shape-conforming layer comprising at least one carbon nanotube.

While the foregoing disclosure is directed to certain disclosed embodiments and methods, various modifications will be apparent to those skilled in the art. It is intended that all modifications that fall within the scopes of the claims relating to this disclosure be deemed as part of the foregoing disclosure. The abstract provided herein is to conform to certain regulations and it should not be used to limit the scope of the disclosure herein or any corresponding claims.

What is claimed is:

1. An apparatus for use in a wellbore, comprising:
    a composition containing a shape-conforming material having a shape memory property and nanoparticles in an amount that is sufficient to provide an elastic modulus of the composition that is greater than the elastic modulus of the shape-conforming material near or above a glass transition temperature of the shape-conforming material, wherein the composition is capable of attaining a first shape when the composition is compressed from a second shape near or above the glass transition temperature of the shape conforming material and is capable of attaining the second shape when the composition is exposed to a selected form of energy.

2. The apparatus of claim 1 wherein the nanoparticles are carbon nanotubes.

3. The apparatus of claim 1 wherein the selected form of energy is at least one of: (i) heat; (ii) electric energy; and (iii) an electromagnetic radiation, including gamma ray radiation, infrared radiation, ultraviolet radiation and microwaves.

4. The apparatus of claim 1 wherein the nanoparticles are about 0.1% to about 10% by weight.

5. The apparatus of claim 1 further comprising at least one member coupled to the composition and forms a device that is at least one of: (i) a sealing device; (ii) an isolator; (iii) a solid particle flow-control device; (iv) a fluid flow-control device; and (v) a tubular having an outer layer of the composition thereon.

6. A composition comprising:
a shape-conforming material having a shape memory property and nanoparticles in an amount that is sufficient to provide an elastic modulus of the composition that is greater than the elastic modulus of the shape-conforming material near or above a glass transition temperature of the shape-conforming material, wherein the composition is capable of attaining a first shape when the composition is compressed from a second shape near or above the glass transition temperature of the shape conforming material and is capable of attaining the second shape when the composition is exposed to a selected form of energy.

7. The composition of claim 6 wherein the amount of the nanoparticles is between about 0.1% to about 10% by weight.

8. The composition of claim 6 wherein the nanoparticles are carbon nanotubes and are selected from a group consisting of: (i) single-walled carbon nanotubes; (ii) multi-walled carbon nanotubes; and (iii) a combination of single-walled and multi-walled carbon nanotubes.

9. The composition of claim 6 wherein the shape-conforming material is a polymer selected from a group consisting of a: (i) foam polymer; (ii) thermoplastic polymer; (iii) thermoset polymer; and (iv) poly(arylene-ethynylene).

10. The composition of claim 9 wherein the polymer is functionalized to provide a molecular level association between the polymer and the nanoparticles.

11. The composition of claim 9 wherein the polymer has a π-conjugated backbone structure that solubilizes at least some of the nanoparticles in the polymer.

12. The composition of claim 11 wherein the composition is compressible from the second shape to the first shape near or above the glass transition temperature of the shape-conforming material and is able to retain the first shape after the temperature falls below the glass transition temperature of the shape-conforming material.

13. The composition of claim 12 wherein the composition returns to the first shape when the composition is activated by a suitable form of energy.

14. The composition of claim 13 wherein the suitable form of energy is at least one of: (i) electric current; (ii) heat; and (iii) electromagnetic radiation, including gamma ray radiation, infrared radiation, ultraviolet radiation and microwaves.

15. The composition of claim 6 wherein the nanoparticles are chosen from a group consisting of nanoparticles made from on or more of: (i) a metal, including gold, silver, platinum, titanium, aluminum, copper, zinc, iron, zirconium, tin and nickel; and (ii) a metal oxide, including iron oxide; and (iii) bucky balls and (iv) graphene.

16. The composition of claim 6 further comprising a deployment modifier.

17. A method of completing a wellbore, comprising:
providing a device having a first shape, the device including a composition made from a shape-conforming material having a shape memory property and nanoparticles in an amount sufficient to cause the composition to attain an elastic modulus that is greater than the elastic modules of the shape-conforming material near or above a glass transition temperature of the shape-conforming material;
placing the device at a downhole location; and
activating the composition in the wellbore to cause the device to attain a second shape.

18. The method of claim 17, wherein the device is at least one of: (i) a seal;
(ii) a packer; (iii) a sand control device; (iv)a fluid flow control device; (v) an anchor; and
(vi) a tubing having an outer layer comprising the composition.

19. The method of claim 17, wherein activating the composition comprises using at least one of: (i) heat; (ii) electrical current; and (iii) an electromagnetic radiation.

* * * * *